United States Patent
Buffa et al.

(10) Patent No.: US 10,145,480 B2
(45) Date of Patent: Dec. 4, 2018

(54) AUTOMATIC RING VALVE SHUTTERS FOR AUTOMATIC RING VALVES AND METHOD FOR MANUFACTURING SAID SHUTTERS

(71) Applicant: Nuovo Pignone Srl, Florence (IT)

(72) Inventors: Francesco Buffa, Florence (IT); Alberto Babbini, Florence (IT); Pierluigi Tozzi, Florence (IT)

(73) Assignee: Nuovo Pignone S.R.L., Florence (IT)

( * ) Notice: Subject to any disclaimer, the term of this patent is extended or adjusted under 35 U.S.C. 154(b) by 0 days.

(21) Appl. No.: 15/029,811

(22) PCT Filed: Oct. 13, 2014

(86) PCT No.: PCT/EP2014/071888
§ 371 (c)(1),
(2) Date: Apr. 15, 2016

(87) PCT Pub. No.: WO2015/055581
PCT Pub. Date: Apr. 23, 2015

(65) Prior Publication Data
US 2016/0238146 A1    Aug. 18, 2016

(30) Foreign Application Priority Data
Oct. 16, 2013   (IT) ................ FI2013A0243

(51) Int. Cl.
*F16K 15/10*    (2006.01)
*F16K 15/08*    (2006.01)
(Continued)

(52) U.S. Cl.
CPC .......... *F16K 15/10* (2013.01); *B23P 15/002* (2013.01); *F04B 39/1053* (2013.01); *F16K 15/08* (2013.01)

(58) Field of Classification Search
CPC .......... F16K 15/10; F16K 15/08; F16K 15/12; B23P 15/002; F04B 39/1053; Y10T 137/86879; Y10T 137/7839
(Continued)

(56) References Cited

U.S. PATENT DOCUMENTS 3,118,649 A * 1/1964 Allen ............... F16K 5/0673
                                                       251/309
4,307,751 A * 12/1981 Mayer ............. F16K 15/08
                                                       137/454.4
(Continued)

FOREIGN PATENT DOCUMENTS

CN    201144779 Y    11/2008
CN    201635966 U    11/2010
(Continued)

OTHER PUBLICATIONS

Italian Search Report and Written Opinion issued in connection with related IT Application No. FI2013A000243 dated Jun. 24, 2014.
(Continued)

*Primary Examiner* — Michael R Reid
(74) *Attorney, Agent, or Firm* — Global Patent Operation; Marc A. Vivenzio

(57) ABSTRACT

An automatic ring valve comprising a valve seat provided with a plurality of gas flow passages arranged according to at least one annular row, at least a shutter comprising at least one ring-shaped portion for selectively closing and opening the gas flow passages, wherein the ring-shaped portion of the shutter comprises a fiber-reinforced matrix, at least one contrasting member for contrasting an opening movement of ring-shaped portion of the shutter, wherein the ring-shaped portion of the shutter comprises continuous fibers, at least some of the fibers developing for at least 360° of the annular development of the ring-shaped portion.

15 Claims, 5 Drawing Sheets

(51) Int. Cl.
*F04B 39/10* (2006.01)
*B23P 15/00* (2006.01)

(58) Field of Classification Search
USPC .......................................... 137/512.1, 625.48
See application file for complete search history.

(56) References Cited

U.S. PATENT DOCUMENTS

| | | | |
|---|---|---|---|
| 4,483,363 A | 11/1984 | Madoche et al. | |
| 4,526,195 A | 7/1985 | Humphrey et al. | |
| 4,870,827 A * | 10/1989 | McFarlin | B29C 70/02 |
| | | | 417/DIG. 1 |
| 5,112,901 A * | 5/1992 | Buchert | F16C 33/201 |
| | | | 428/299.1 |
| 7,011,111 B2 | 3/2006 | Spiegl et al. | |
| 7,738,763 B2 | 6/2010 | Ouderkirk et al. | |
| 8,048,815 B2 | 11/2011 | Kubota et al. | |

FOREIGN PATENT DOCUMENTS

| | | | | |
|---|---|---|---|---|
| EP | 1310712 | A2 | 5/2003 | |
| GB | 1025713 | A * | 4/1966 | .......... F04B 39/1053 |
| RO | 115376 | B | 1/2000 | |
| RU | 2407938 | | 8/2006 | |
| WO | 2013087615 | A1 | 6/2013 | |
| WO | 2013131976 | A1 | 9/2013 | |

OTHER PUBLICATIONS

International Search Report and Written Opinion issued in connection with corresponding PCT Application No. PCT/EP2014/071888 dated Jan. 16, 2015.
Office Action issued in connection with corresponding CN Application No. 201480057020.0 dated Apr. 26, 2017.
Decision to grant and search report issued in connection with corresponding RU Application No. 22016113383 dated May 15, 2018.
Pierluigi, T., et al., Automatic Ring Valve, Shutters For Automatic Ring Valves, And Method For Manufacturing Said Shutters, GE Co-Pending Application No. FI2014A000246, filed on Nov. 5, 2014.

* cited by examiner

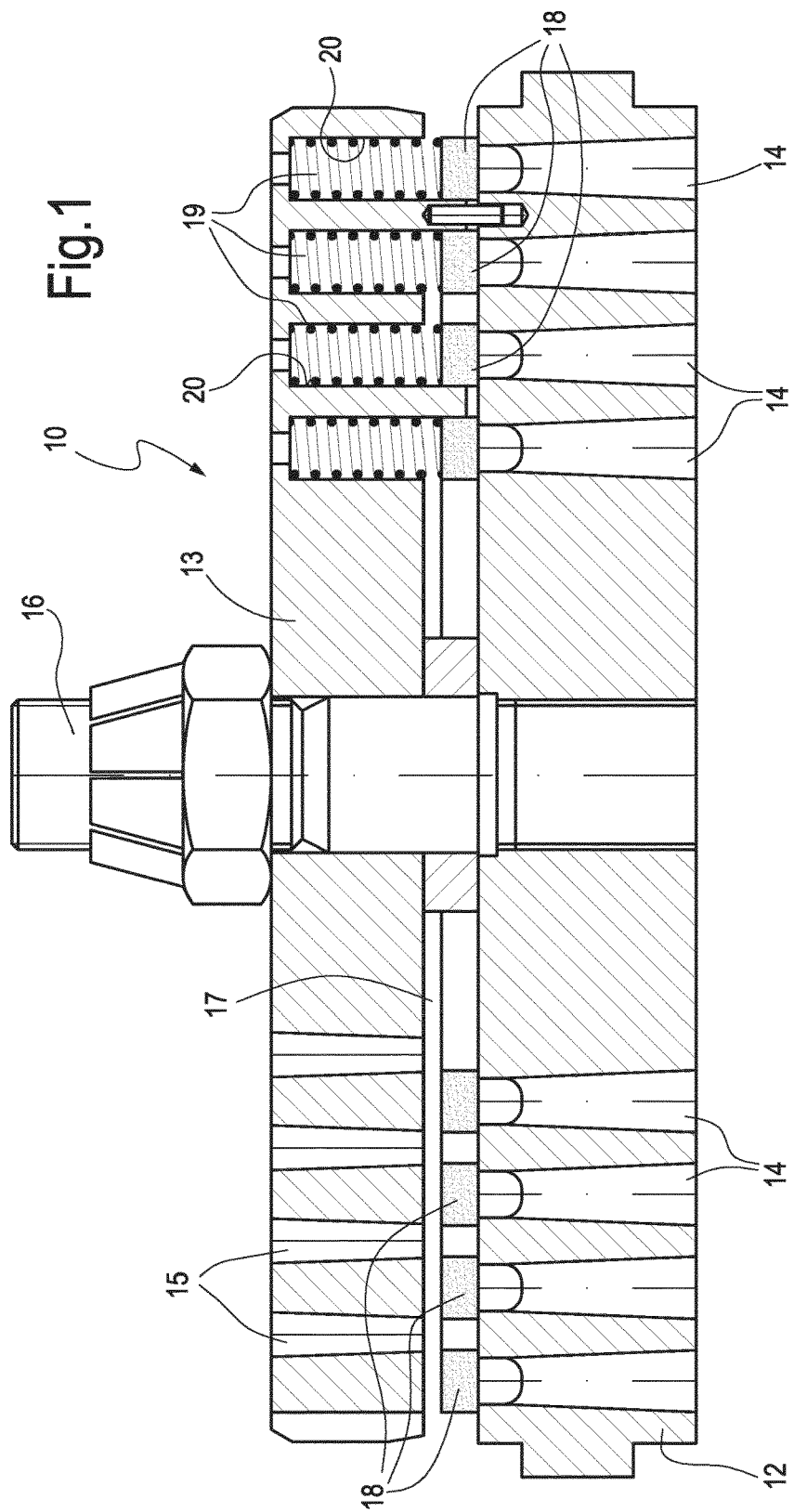

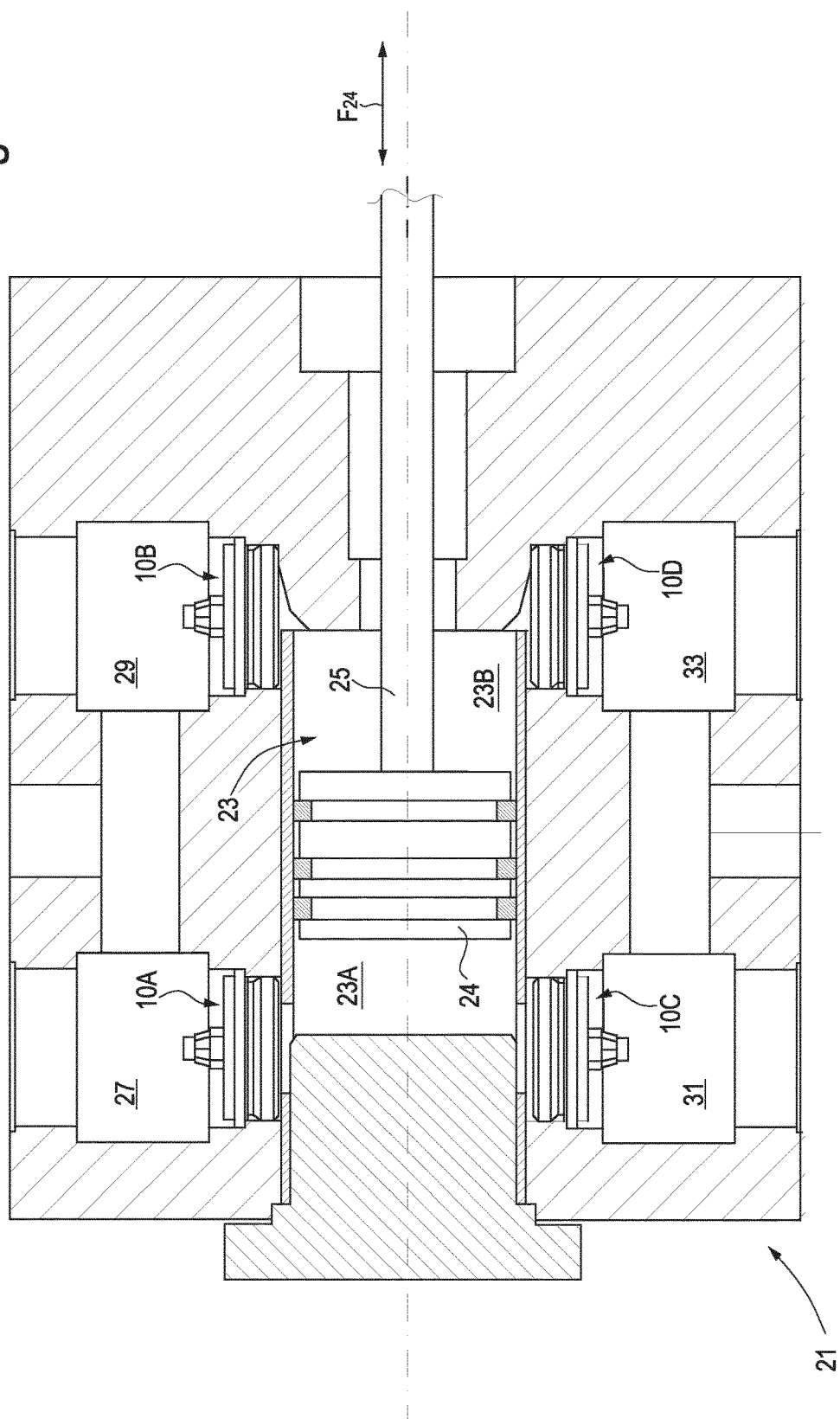

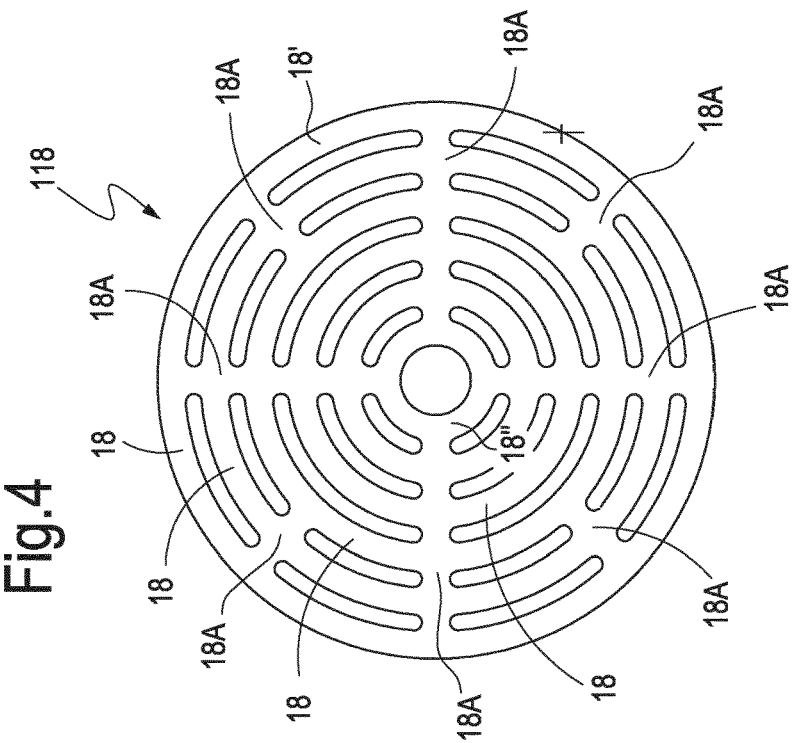
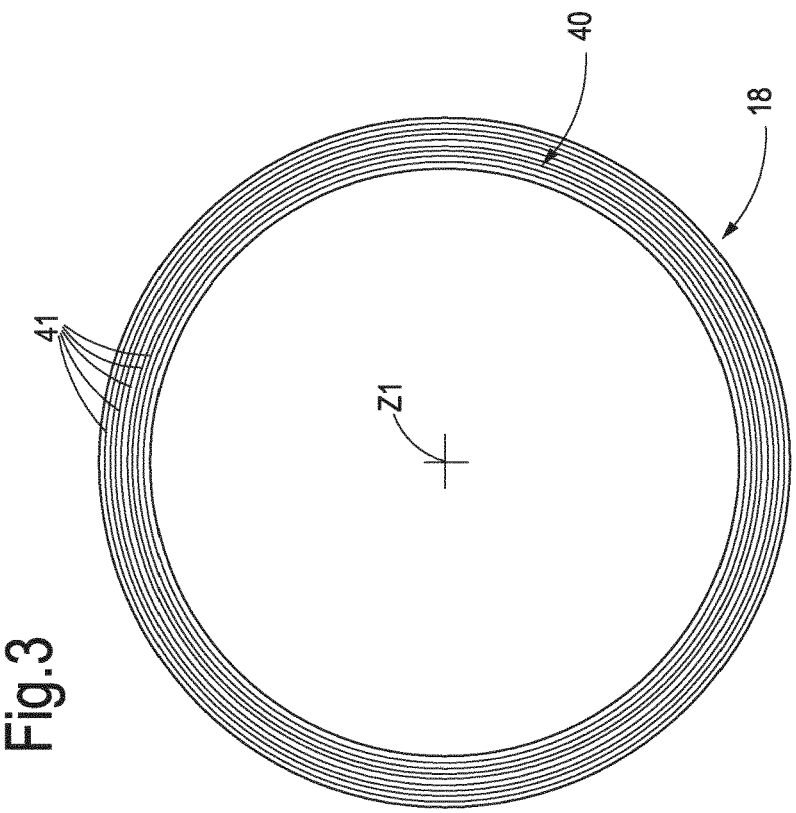

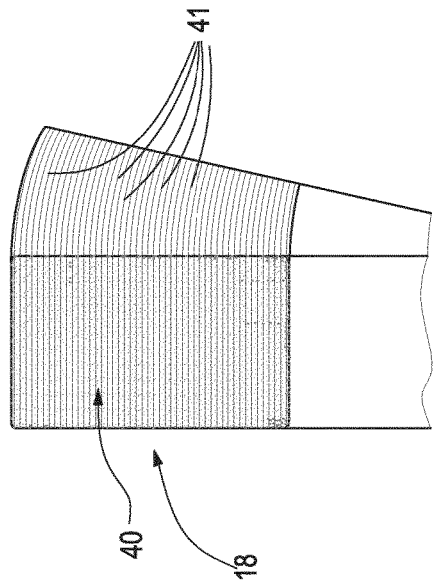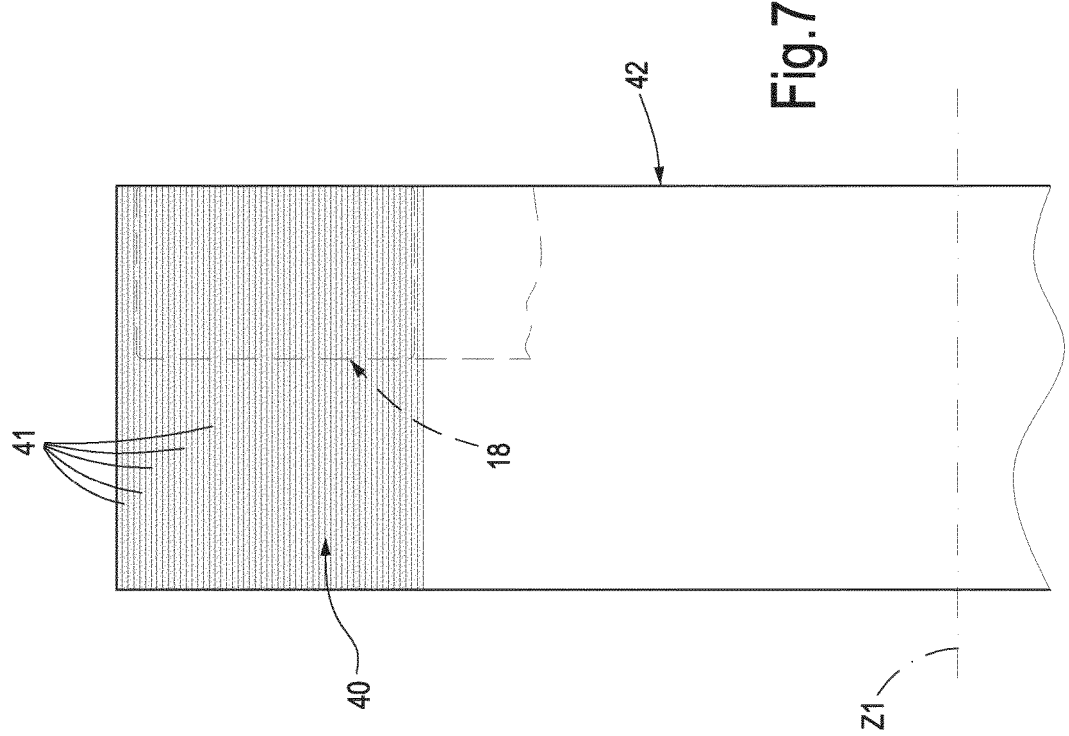

AUTOMATIC RING VALVE SHUTTERS FOR AUTOMATIC RING VALVES AND METHOD FOR MANUFACTURING SAID SHUTTERS

CROSS REFERENCE TO RELATED APPLICATIONS

This application is a national stage application under 35 U.S.C. § 371(c) of prior filed, co-pending PCT application serial number PCT/EP2014/071888, filed on Oct. 13, 2014, which claims priority to Italian Patent Application Serial No. FI2013A000243, filed on Oct. 16, 2013. The above-listed applications are herein incorporated by reference.

BACKGROUND

The present disclosure relates to automatic valves; such as ring valves. Some embodiments of the subject matter disclosed herein relate specifically to reciprocating compressor automatic ring valves. According to a further aspect, the disclosure relates to reciprocating compressors including the automatic ring valves. According to another aspect, the disclosure relates to a shutter for automatic ring valves. According to a further aspect, the disclosure relates to a method for manufacturing a ring shutter for an automatic ring valve.

Automatic valves are commonly used for example in reciprocating compressors. Automatic valves are arranged on both the suction side as well as the discharge side of the compressor, to automatically open and close the suction port and discharge port of the compressor under the control of the pressure inside the compressor cylinder.

As know, an automatic ring valve can comprise a valve guard and a valve seat, the latter provided with circumferentially arranged gas flow passages extending through the valve seat. Also the valve guard is provided with gas flow passages. A plurality of concentrically arranged shutter rings is placed between the valve seat and the valve guard. Each shutter ring is arranged along a set of corresponding annularly arranged gas flow passages of the valve seat. Compression springs are provided between the valve guard and each shutter ring to oppose the movement of the shutter ring from the closed position, wherein the respective set of gas flow passages are closed.

Differential pressure across the valve causes automatic opening and closing of the valve. The crank shaft of reciprocating compressors using such valves can rotate at a rotary speed in the range of for example 100-1200 rpm and typically between 200 and 1000 rpm. The shutter rings are therefore subject to repeated opening and closing strokes at high speed. They are commonly made of composite material, such as short fiber-reinforced synthetic resin to reduce the mass thereof and thus the inertia. The valve seat and the valve guard are typically made of metal.

SUMMARY OF THE INVENTION

According to a first aspect, the subject matter disclosed herein provides for an automatic ring valve system comprising a valve seat having gas flow passages arranged according to at least one annular row, and at least a shutter comprising at least a ring-shaped portion for selectively closing and opening the gas flow passages relative to an annular row. The valve system further comprises means, such as one or more resilient members, for contrasting the opening movement of the ring-shaped portion of the shutter from a closing position to an opening position. In an embodiment, ring-shaped portion of the shutter comprises a matrix or layer, made of synthetic polymeric resin material and reinforced with continuous fibers, wherein at least some of the fibers develop for at least 360° of the annular development of the ring-shaped portion of the shutter. Surprisingly, this configuration of ring-shaped portion of the shutter allows obtaining high buckling strength during opening/closing impacts.

The use of continuous fibers allows a significant increase of the filler fraction of the ring-shaped portion of the shutter, i.e. the percentage of fibers in the ring-shaped portion of the shutter. Increased amounts of filler in the resin matrix in turn reduce the coefficient of thermal expansion of the ring-shaped portion of the shutter, thus substantially reducing the difference between the thermal expansion of the shutter and the thermal expansion coefficient of the valve seat and reduces the sensitivity of the valve efficiency to temperature changes.

According to some embodiments, the ring-shaped portion is formed by pre-impregnated ("prepreg") composite continuous fibers.

In some embodiments, the matrix has a layered structure with layers including the continuous fibers.

In other exemplary embodiments, the matrix is formed by wound portions of at least one elongated flexible element comprising the continuous fibers developing in the direction of the flexible element, wherein the wound portions are bonded together.

The flexible element comprises a polymeric resin and continuous fibers, with fibers arranged in and along the development of the flexible element.

An elongated flexible element can be "endless", or in the form of a tape, a tow, a strip, a rope, a line, a belt, a band, a ribbon etc. The flexible element can comprise pre-impregnated composite continuous fibers.

According to some embodiments, the continuous fibers surround the central axis of the ring-shaped portion of the shutter.

In some embodiments, the continuous fibers are arranged according to a substantially helical development about the axis of the ring-shaped portion. According to other embodiments, the continuous fibers develop in a substantially spiral development about the center of the ring-shaped portion.

According to some exemplary embodiments the amount of the continuous fibers is comprised between 30% and 80% by weight on the total weight of the ring-shaped portion.

According to some embodiments, the linear thermal expansion coefficient, in the same direction of the fibers (in the case of a ring-shaped object, a circumferential direction) is comprised between $0.05 \times 10^{-6}/°C$ and $10 \times 10^{-6}/°C$.

The polymeric resin can be of the thermoplastic or thermoset type. In some embodiments, the polymeric resin is chosen from the group comprising Polyetheretherketone (PEEK), polyaryletherketones (PAEK), Polyphenylene Sulfide (PPS), Polysulfone (PSU), Polyphenylene Sulfide (PPS), Polyamide (PA), polyphthalamide (PPA), polyamide-imide (PAI), Polyethylene (PE), Polycarbonates (PC), Polyetherimide (PEI), polytetrafluoroethylene (PTFE), Polyimide (PI), polybenzimidazole (PBI), or epoxy resins.

In some embodiments, the continuous fibers are chosen from the group comprising glass fibers, E-glass fibers, ECR-glass fibers, S-glass fibers, carbon fibers, STD carbon fibers, IM carbon fibers, HM carbon fibers, UHM carbon fibers, aramid fibers.

In an embodiment, the shutter can be made of single concentrical rings separated one from the other.

According to other embodiments, shutter can be made in one piece and comprises a plurality of coaxially arranged ring-shaped portions connected to one another by one or more transversal portions.

The new structure of the valve shutter according to embodiments of the present invention increases durability of the shutter in comparison with the valves plastic rings of the known type, improving impact resistance and stiffness.

According to a second aspect, the subject matter disclosed herein provides for a shutter for an automatic ring valve according to one or more of the preceding embodiments mentioned above. According to some embodiments, the shutter is in form of a ring adapted for closing/opening a relative annular row of gas flow passages arranged in the valve seat of the automatic ring valve; according another point of view, the shutter can be made of single concentrical independent rings (therefore each ring is a ring-shaped portion of the shutter). According to other embodiments, the shutter comprises a plurality of coaxial a ring-shaped portions joined together forming a one-piece body for closing/opening the gas flow passages arranged in annular rows in the valve seat.

According to a third aspect, the subject matter disclosed herein provides for the use of a ring-shaped portion body according to one or more of the preceding embodiments provided above, as a shutter or a portion of shutter of an automatic ring valve.

According to a fourth aspect, the subject matter disclosed herein provides for a method for manufacturing a shutter or a shutter portion for an automatic ring valve, comprising the steps of winding at least one elongated flexible element comprising a polymeric resin and continuous fibers, with fibers arranged in and along the flexible element, on and around a cylindrical structure, such that a substantially cylindrical multilayers configuration is formed; bonding the layers of the at least one flexible element to form a one-piece product having a broadly cylindrical shape; cutting at least one ring-shaped portion from a part of the one piece product.

This method allows providing shutters for automatic ring valve in an economic manner and with increased mechanical properties.

As stated above, the flexible element comprises a polymeric resin and continuous fibers, with fibers arranged in and along the development of the flexible element. A flexible element can be "endless" or in the form of a tape, a tow, a strip, a rope, a line, a belt, a band, a ribbon etc. The flexible element can comprise pre-impregnated composite continuous fibers.

The ring-shaped portion can be cut or machined out from the one-piece product, for example, by conventional or not conventional machining, such as turning, boring, drilling, milling, laser cutting, water jet cutting etc.

According to some embodiments, the one-piece product is divided into annular slices and then the at least one ring-shaped portion is cut from an annular slice.

One or more rings of a shutter can be obtained from a single annular slice.

According to other embodiments, the one-piece product is divided into annular slices and then the shutter is formed by making through holes, more particularly slots or elongated holes through an annular slice such that the shutter is made in one piece and comprises a coaxial plurality of ring-shaped portions and a plurality of transversal portions joining together the ring-shaped portions. As an example, the silhouette of the one piece shutter between the external and internal ring-shaped portions can be complementary to the silhouette of relative part of the valve plate.

According to some embodiments, the at least one flexible element is wound helicoidally around and along the axis of the cylindrical structure. Therefore, the flexible element moves relative to the cylindrical structure (or vice-versa) with rotation and translation parallel to the axis.

According to some embodiments of the disclosure, the at least one flexible element is wound in a substantially inclined manner with respect to the axis of the cylindrical structure.

According to some embodiments, the at least one flexible element is wound around the cylindrical structure according to automated fiber placement (AFP) technique. This technique provides for winding on a mandrel a plurality of flexible element (with continuous filaments embedded in a polymeric matrix) helicoidally around and along the axis of the mandrel (or bar).

In other exemplary embodiments, the at least one flexible element is wound spirally around the axis of the cylindrical structure. Therefore, in this case, the flexible element moves relative to the cylindrical structure (or vice-versa) only with rotation around the axis.

According to some embodiments, the at least one flexible element is wound in a substantially orthogonal manner with respect to the axis of the cylindrical structure.

In other exemplary embodiments, the at least one flexible element is a tape wound around the cylindrical structure according to automated tape laying (ATL) technique. This technique provides for winding on a mandrel a single tape (with continuous filaments embedded in a polymeric matrix) such that at every winding round the new tape portion overlaps the underlying tape portion with constant width (the tape has a lay up of 90° with respect to the winding axis).

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 1 illustrates a section view of an automatic ring valve according to an embodiment of the present invention;

FIG. 2 illustrates the head of a reciprocating compressor using four automatic ring valves as the one shown in FIG. 1;

FIG. 3 illustrates a schematic transversal view of a shutter ring for an automatic ring valve according to some embodiments of the present disclosure;

FIG. 4 illustrates a schematic transversal view of a shutter for an automatic ring valve according to some embodiments of the present disclosure;

FIG. 7 illustrates another schematic transversal view of an intermediate annular product, similar to that of FIG. 5, of a method for manufacturing a shutter ring according to some embodiments of the present disclosure;

FIG. 8 illustrates a schematic portion of shutter ring cut off from the intermediate annular product of FIG. 7.

DETAILED DESCRIPTION

Figure 6:
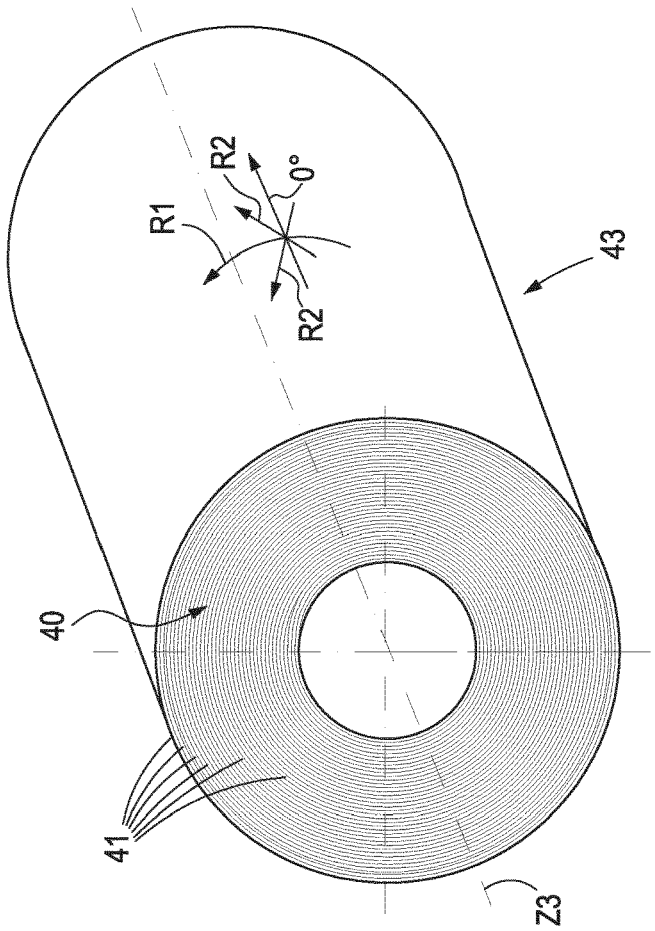
FIG. 6 illustrates another schematic transversal view of an intermediate annular product of a method for manufacturing a shutter ring or a shutter according to some embodiments of the present disclosure.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

An automatic ring valve according to an embodiment of the present invention is illustrated in FIG. 1. The automatic ring valve 10 comprises a valve seat 12 and a valve guard 13. The valve seat is provided with circumferentially arranged gas flow passages 14 extending through the valve seat 12. The valve guard 13 is in turn provided with gas flow passages 15. A central screw 16 connects the valve seat 12 and the valve guard 13 to one another leaving a space 17 there between. A plurality of concentrically arranged shutter rings 18 is provided between the valve seat 12 and the valve guard 13. Each shutter ring 18 is arranged along a set of corresponding annularly arranged gas flow passages 14 of the valve seat 12. A plurality of contrasting members for contrasting an opening movement of the shutter rings 18 are provided; as an example, these members consist of a plurality of resilient members, as compression springs 19, for each shutter ring 18 for biasing the shutter ring 18 in a closed position, wherein the shutter ring 18 closes the respective set of gas flow passages 14 by sealingly contacting corresponding sealing surfaces of the gas flow passages 14. The compression springs 19 are housed in respective spring pockets 20 provided in the valve guard 13.

Differential pressure across the valve 10 causes automatic opening and closing of the valve. FIG. 2 illustrates the head 21 of a reciprocating compressor using four automatic ring valves 10 arranged on the suction ports and discharge ports of the compressor and designated 10A, 10B, 10C, 10D.

More in detail, the compressor head 21 defines a compressor cylinder 23 wherein a piston 24 is reciprocatingly movable. A rod 25 of the piston 24 is connected to a crank (not shown), which reciprocatingly moves the piston 24 according to double arrow f24. The piston 24 divides the cylinder 23 into two separate compression chambers 23A, 23B.

The compressor head 21 is provided with a first suction port 27 in fluid communication with the first compression chamber 23A through a first automatic ring valve 10A. A second suction port 29 is in fluid communication with the second compression chamber 23B through a second automatic ring valve 10B. A first discharge port 31 is in fluid communication with the first compression chamber 23A through a third automatic ring valve 10C and a second discharge port 33 is in fluid communication with the second compression chamber 23B through a fourth automatic ring valve 10D.

The reciprocating motion of the piston 24 causes selectively suction of the gas in the first compression chamber 23A and discharge of compressed gas from the second compression chamber 23B and vice versa. The automatic ring valves 10A, 10B, 10C and 10D selectively open when the pressure in the first gas flow passages 14 exceeds the resilient force of the springs 19.

The crank shaft of reciprocating compressors can rotate at a rotary speed in the range of for example 100-1200 rpm and typically between 200 and 1000 rpm. The shutter rings 18 are therefore subject to repeated opening and closing strokes at high speed. The valve seat 12 and the valve guard 13 are, as an example, made of metal.

Each shutter ring 18 comprises a fiber-reinforced matrix 40, described below, in order to reduce the inertia of the moving shutter. According to embodiments of the present invention, the fibers of the fiber-reinforced matrix are continuous fibers 41, and at least a group of them develops for at least 360° of the annular development of the ring. More particularly, almost the totality of the fibers are continuous fibers developing for more than 360° of the annular development of the ring.

Practically speaking, the continuous fibers surround the central axis Z1 of the shutter ring 18. A schematic sectional front view of a shutter ring 18 is shown in FIG. 3, wherein continuous fibers 41 are depicted by concentric circles.

According to some embodiments, the matrix 40 comprises a polymeric resin wherein the continuous fibers 41 are embedded. More particularly, the polymeric resin is Polyetheretherketone (PEEK), that is a thermoplastic resin.

Other kind of polymeric resin can be chosen, as an example, from the group comprising Polyetheretherketone (PEEK), polyaryletherketones (PAEK), Polyphenylene Sulfide (PPS), Polysulfone (PSU), Polyphenylene Sulfide (PPS), Polyamide (PA), polyphthalamide (PPA), polyamide-imide (PAI), Polyethylene (PE), Polycarbonates (PC), Polyetherimide (PEI), polytetrafluoroethylene (PTFE), Polyimide (PI), polybenzimidazole (PBI), or epoxy resins.

The resin can be also of the thermoset type.

In an embodiment, the continuous fibers 41 are chosen from the group comprising glass fibers, E-glass fibers, ECR-glass fibers, S-glass fibers, carbon fibers, STD carbon fibers, IM carbon fibers, HM carbon fibers, UHM carbon fibers, aramid fibers.

More particularly, the quantity of the continuous fibers is comprised between 30% and 80% by weight on the total weight of the ring-shaped portion.

According to some embodiments, the linear thermal expansion coefficient, in the same direction of the fibers (in the case of a ring-shaped object, a circumferential direction) is comprised between $0.05 \times 10-6/°$ C. and $10 \times 10-6/°$ C.

As an example, with a matrix resin made by PEEK with 68% by weight of continuous carbon fibers embedded, the linear thermal expansion coefficient is $0.27 \times 10-6/°$ C.

The use of continuous fibers allows the increase of the filler fraction in the ring material, with reduction of the differential of the coefficient of expansion, in absolute value, of the valve seat material and of the shutter ring material and, at the same time, a surprising increase of the buckling strength of the shutter during opening/closing impacts, with clear benefits in terms of durability and toughness of the shutter and in terms of reliability of the sealing of valve.

In an embodiment, the matrix has a layered structure with layers including the continuous fibers. The matrix can be formed by wound portions of flexible element, as a tape T (or other kind of flexible elements as defined above) comprising the continuous fibers 41 developing in the direction of the flexible element. The wound portions are bonded together forming the structure of the shutter. In case of thermoplastic resin, the bonding action can be a thermo-bonding action.

Figure 5:
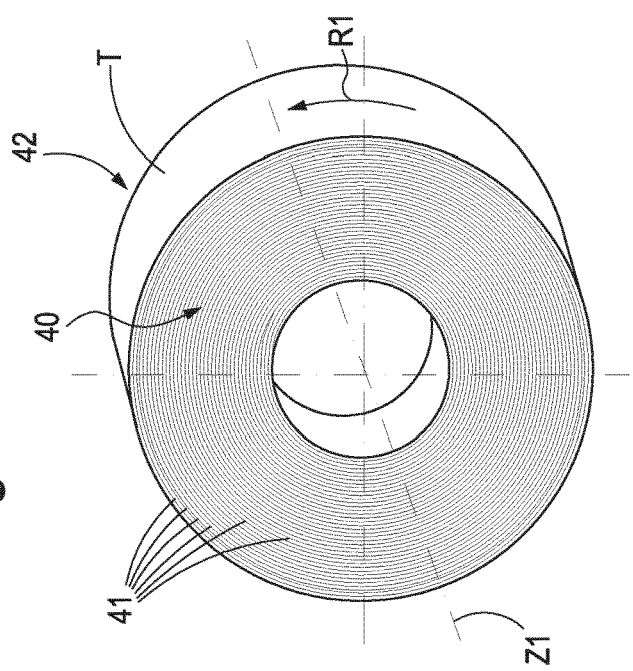
FIG. 5 illustrates a schematic transversal view of an intermediate annular product of a method for manufacturing a shutter ring or a shutter according to some embodiments of the present disclosure.

In FIG. 5 is shown an annular piece 42, with cylindrical shape, made of a wound tape with a lay up of 90°—arrow R1—(that means that, at every winding round, the new tape portion overlaps the underlying tape portion with constant width; the tape has a lay up of 90° with respect to the winding axis Z1). The tape is formed as the matrix 40, that is a polymeric structure wherein the continuous fibers are embedded, developing in the direction of the tape.

Practically speaking, the continuous fibers overlaps according to a substantially orthogonal direction with respect to the axis Z1 of the annular piece 42 (a continuous fiber develops in a plane orthogonal to the axis Z1 of the piece 42).

According to this configuration, the continuous fibers 41 develop in a substantially spiral development about the center/axis of the piece 42.

From this annular piece 42, a ring 18 can be cut off (see FIG. 7, wherein the shape of a ring 18 is depicted, by a hidden line, inside the longitudinal sectional view of a portion of annular piece 42; in FIG. 8, the portion of the ring 18 cut off by the annular piece 42, is shown).

The cutting off is useful to guarantee the correct dimensional tolerance to the ring. It is clear that in other example, a ring 18 can be manufactured directly winding, on a mandrel with diameter equal to the internal diameter of the ring 18, a tape with a width equal to the height (dimension parallel to the axis) of the ring 18, until the external diameter of the wound tape is equal to the external diameter of the ring. The cutting off may be made in such a way that the continuous fibers develop in a substantially orthogonal development with respect to the axis Z1 of the shutter ring 18 (a continuous fiber develops in a plane orthogonal to the axis of the shutter ring 18).

In FIG. 6 is shown a further annular piece 43, with cylindrical shape, like an annular billet, having a height longer than the height of the annular piece 42 of FIG. 5. In this case, the further annular piece 43 can be made of a wound tape with a lay up of 90° with width greater than the width of the tape of the case of FIG. 5.

Alternatively, the further annular piece 43 can be made of a wound flexible element with a lay up different from 90°, with width similar to the width of the tape of the case of FIG. 5. That means that the continuous fibers develop in a substantially helical development about the axis Z3 (the winding axis) of further annular piece 43. Practically speaking, the continuous fibers develop in a substantially inclined development (e.g. 45° from the axis direction 0°) with respect to the axis Z3 of annular piece 43 (arrow R2).

In this latter case, multiple flexible elements can be used, with same or inclined development with respect to the axis Z3 can be used.

In other examples, in place of one or more tapes, one or more prepreg composite tows can be used, wherein the polymeric resin used for impregnating the continuous fibers, as such the fibers, can be of the same type of the tape solutions.

In FIG. 4, a different valve shutter 118 is shown. In this case, the shutter 118 is made in one piece of concentric ring-shaped portions 18 joined together by transversal portions 18A. More particularly, those transversal portions 18A are provided along radial direction of the ring portions 18.

The method for manufacturing a shutter or a shutter portion for an automatic ring valve according to what the before, comprises the steps of winding at least one flexible element T comprising a polymeric resin and continuous fibers 41, with fibers arranged in and along the flexible element T, on and around a cylindrical structure, such that a substantially cylindrical multilayers configuration is formed, bonding the layers of the at least one flexible element to form a one-piece product having a broadly cylindrical shape, cutting at least one ring-shaped portion from a part of the one piece product.

The cutting off of the ring-shaped portion can be made, for example, by conventional or not conventional machining, as turning, boring, drilling, milling, laser cutting, water jet cutting etc.

Considering the case of the one piece product in the form of an annular billet 43, the latter can be divided into annular slices (similar to the annular body 42) and then the one ring-shaped portion 18 is cut off from one annular slice as stated before at point (c).

From one annular slice can be provided one or more rings composing the shutter.

In the case of a shutter 118 as shown in FIG. 4, the one piece product 42 (or a slice of the annular billet 43) is cut off by making through holes, more particularly slots or elongated holes, through the thickness of the piece (axial direction), such that the shutter 118 is comprised of a coaxial plurality of ring-shaped portions 18 and a plurality of transversal portions 18A joining together the ring-shaped portions 18. The silhouette of the one piece shutter 118 between the external and internal ring-shaped portions 18' and 18" can be complementary to the silhouette of relative part of the valve plate.

As referenced before, one or more "endless" or elongated flexible elements can be wound helicoidally around and along the axis Z3 of the cylindrical structure (the annular billet 43). Therefore, the flexible elements move relative to the cylindrical structure (or vice-versa) with rotation and translation parallel to the axis Z3. That means that the flexible elements are wound in a substantially inclined manner with respect to the axis Z3 of the cylindrical structure 43. As an examples, one or more tows are wound around the cylindrical structure according to automated fiber placement (AFP) technique.

In other exemplary embodiments of the method, one or more flexible elements are wound spirally around the axis Z1 of the cylindrical structure 42 or 43. Therefore, in this case, the flexible elements move relative to the cylindrical structure (or vice-versa) only with rotation around the axis Z1. Therefore, the flexible elements are wound in a substantially orthogonal manner with respect to the axis of the cylindrical structure 42, 43. As an example, one tape is wound around the cylindrical structure according to automated tape laying (ATL) technique.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. An automatic ring valve comprising:
    a valve seat provided with a plurality of gas flow passages arranged according to at least one annular row,
    at least a shutter comprising at least one ring-shaped portion for selectively closing and opening the gas flow passages, wherein the at least one ring-shaped portion of the shutter comprises a fiber-reinforced matrix, and
    at least one compressing spring for contrasting an opening movement of the at least one ring-shaped portion of the shutter,
    wherein the at least one ring-shaped portion of the shutter comprises continuous fibers, at least some of the continuous fibers forming at least 360° of the ring-shaped portion and wherein the at least one ring-shaped portion is a portion cut from a part of a one-piece product comprising a plurality of coaxially arranged ring-shaped portions, wherein the at least one-piece product has a broadly cylindrical shape.

2. The automatic ring valve according to claim 1, wherein the matrix has a layered structure.

3. The automatic ring valve according to claim 1, wherein the fiber-reinforced matrix is formed by wound portions of at least one flexible element comprising the continuous fibers forming in the direction of the continuous flexible element, wherein the wound portions are bonded together.

4. The automatic ring valve according to claim 1, wherein the continuous fibers surround a central axis of the at least one ring-shaped portion of the shutter.

5. The automatic ring valve according to claim 1, wherein the continuous fibers are arranged in a substantially inclined development with respect to the axis of the ring-shaped portion.

6. The automatic ring valve according to claim 1, wherein the continuous fibers are arranged in a substantially spiral development about the center of the ring-shaped portion.

7. The automatic ring valve according to claim 1, wherein the continuous fibers are overlapped according to an orthogonal direction with respect to an axis of the ring-shaped portion.

8. The automatic ring valve according to claim 1, wherein the quantity of the continuous fibers is comprised between 30% and 80% by weight on the total weight of the ring-shaped portion.

9. The automatic ring valve according to claim 1, wherein the linear thermal expansion coefficient of the ring-shaped portion, in the same direction of the fibers, is comprised between $0.05 \times 10^{-6}/°C$ and $10 \times 10^{-6}/°C$.

10. The automatic ring valve according to claim 1, wherein the matrix comprises a polymeric resin.

11. The automatic ring valve according to claim 10, wherein the matrix comprises a polymeric resin of thermoplastic or thermoset type.

12. The automatic ring valve according to claim 10, wherein the polymeric resin is chosen from the group comprising Polyetheretherketone (PEEK), Polyaryletherketones (PAEK), Polyphenylene Sulfide (PPS), Polysulfone (PSU), Polyphenylene Sulfide (PPS), Polyamide (PA), Polyphthalamide (PPA), Polyamide-Imide (PA I), Polyethylene (PE), Polycarbonates (PC), Polyetherimide (PEI), Polytetrafluoroethylene (PTFE), Polyimide (PI), Polybenzimidazole (PBI), or Epoxy Resins.

13. The automatic ring valve according to claim 1, wherein the continuous fibers are chosen from the group comprising glass fibers, E-glass fibers, ECR-glass fibers, S-glass fibers, carbon fibers, STD carbon fibers, IM carbon fibers, HM carbon fibers, UHM carbon fibers, aramid fibers.

14. The automatic ring valve according to claim 1, wherein the shutter is made in one piece and comprises a plurality of coaxially arranged ring-shaped portions and a plurality of transversal connections joining the ring-shaped portions to one another.

15. A reciprocating compressor comprising an automatic ring valve, wherein the automatic ring valve comprises:
    a valve seat provided with a plurality of gas flow passages arranged according to at least one annular row,
    at least a shutter comprising at least one ring-shaped portion for selectively closing and opening the gas flow passages, wherein the at least one ring-shaped portion of the shutter comprises a fiber-reinforced matrix, and
    at least one compressing spring for contrasting an opening movement of the at least one ring-shaped portion of the shutter,
wherein the at least one ring-shaped portion of the shutter comprises continuous fibers, at least some of the fibers forming at least 360° of the ring-shaped portion and wherein the at least one ring-shaped portion is a portion of a part of a one-piece product comprising a plurality of coaxially arranged ring-shaped portions, wherein the at least one-piece product has a broadly cylindrical shape.

* * * * *